May 13, 1941.  S. T. EVENSTAD ET AL  2,241,546

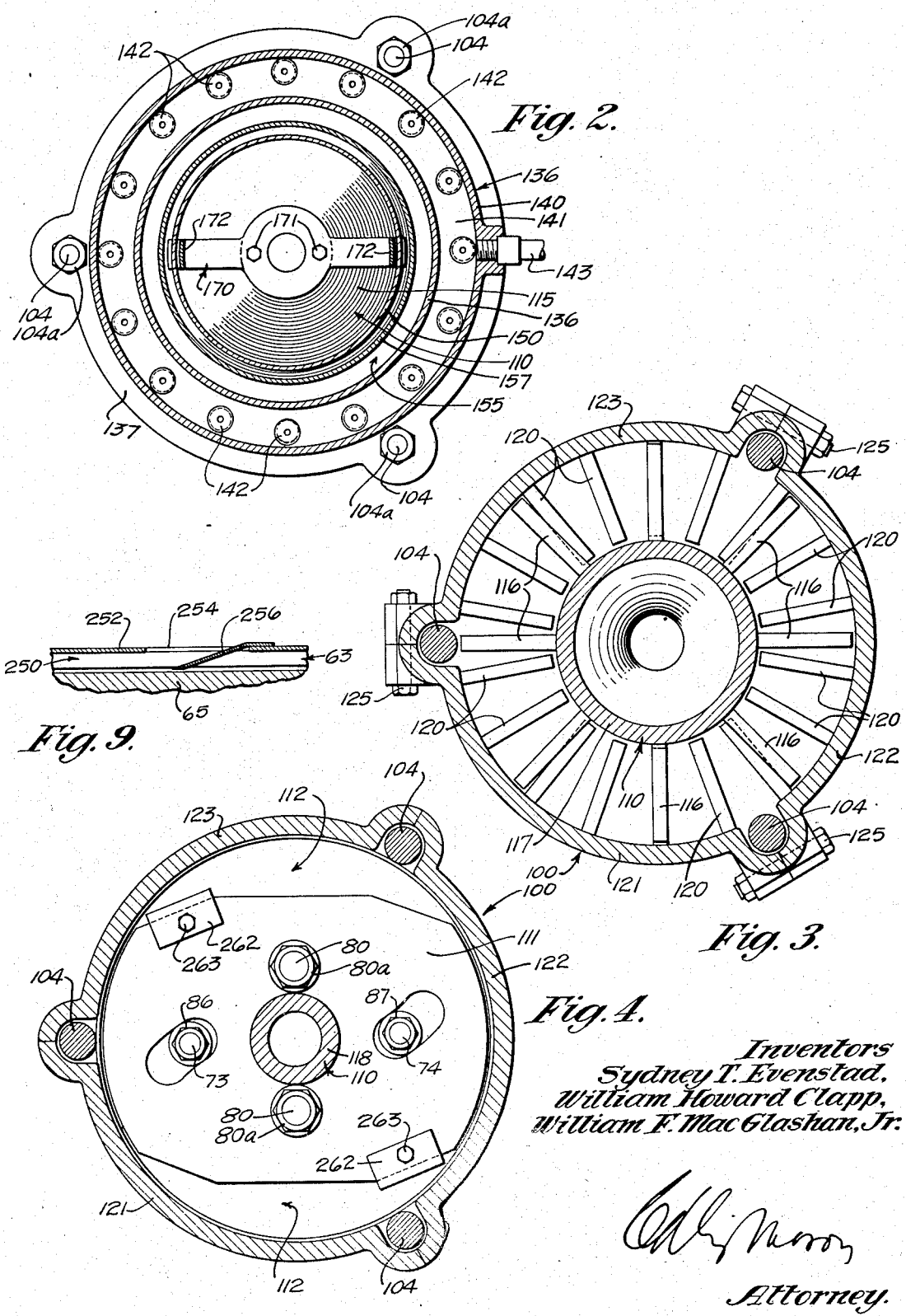

PELLET MACHINE

Filed Nov. 12, 1938  4 Sheets-Sheet 3

Inventors
Sydney T. Evenstad,
William Howard Clapp,
William F. MacGlashan, Jr.

Attorney.

May 13, 1941.  S. T. EVENSTAD ET AL  2,241,546

PELLET MACHINE

Filed Nov. 12, 1938   4 Sheets-Sheet 4

Inventors
Sydney T. Evenstad,
William Howard Clapp,
William F. MacGlashan, Jr.

Attorney.

Patented May 13, 1941

2,241,546

UNITED STATES PATENT OFFICE 2,241,546

PELLET MACHINE

Sydney T. Evenstad, Alhambra, and William Howard Clapp and William F. MacGlashan, Jr., Pasadena, Calif.

Application November 12, 1938, Serial No. 240,108

10 Claims. (Cl. 107—8)

This invention has to do with devices for producing pellets, nodules and the like from moldable materials.

One of the principal uses of such pellet machines is in forming suitable stock feed mixtures into pellets of a proper size for consumption. In the pellet machines of which we are aware, however, by virtue of the slow passage of the material through the machine, and consequent subjection of the material to heat during the relatively long period of time required to prepare the mash and form the pellets, many of the most essential vitamins and ingredients of the material are destroyed or seriously disintegrated. There are other shortcomings which have contributed to the impracticability of prior pellet machines. For instance, because of improper admixture of the moisture element (usually steam) with the material, there is no uniformity of product. Lack of simplicity in construction and lack of facility for easy assembling, disassembling, adjustment and control of such devices have also resulted in unsatisfactory performance of prior art devices. It is therefore our aim to effectively cure those and other shortcomings.

While other objects and corresponding accomplishments are inherent in our invention, and will become obvious from the description of one preferred adaptation which we shall hereinafter give, we shall specifically name a few of the more particular objects.

We aim to provide a device of the character described which is compact and easy to assemble and disassemble for replacement and repair purposes and in which pellets of uniform size and consistency may be continuously and speedily produced.

Another object is to provide a device having relatively few moving parts which rotate in balance about a main axis so that they exert a minimum of radial pressure upon the bearings.

Another object is to provide a pellet machine capable of rapidly forming hard, firm pellets while using a minimum of pressure and without disintegrating the pellet forming material during the operation.

Another object is to provide in such a machine a wide range of visible cutter adjustments and in which the cutters themselves move the formed pellets along paths leading to the conveyor.

Another object is to provide a machine in which the operation of the pellet shearing members is visible from any position around the device.

Another object is to provide for the even, efficient admixture of moisture with the pellet forming mash while the mash is in suspension in the mixer.

Another object is to provide an easily controllable, adjustable and efficient means for feeding the mash material to the mixing chamber.

Another object is to provide a novel and efficient means of adjusting the impactor elements.

Another object is to provide a structure in which the principal moving parts are assembled on a single vertically disposed drive shaft.

Another object is to provide means for forming the pellets whereby they are composed of thin laminations of material.

How these and other objects are attained will become obvious from the following detailed description of one presently preferred adaptation of our invention, for which purpose I shall make reference to the following drawings, in which:

Fig. 2 is an enlarged section on line 2—2 of Fig. 1;

Fig. 3 is an enlarged section on line 3—3 of Fig. 1;

Fig. 4 is an enlarged section on line 4—4 of Fig. 1;

Fig. 9 is a section on line 9—9 of Fig. 5;

Figure 1:
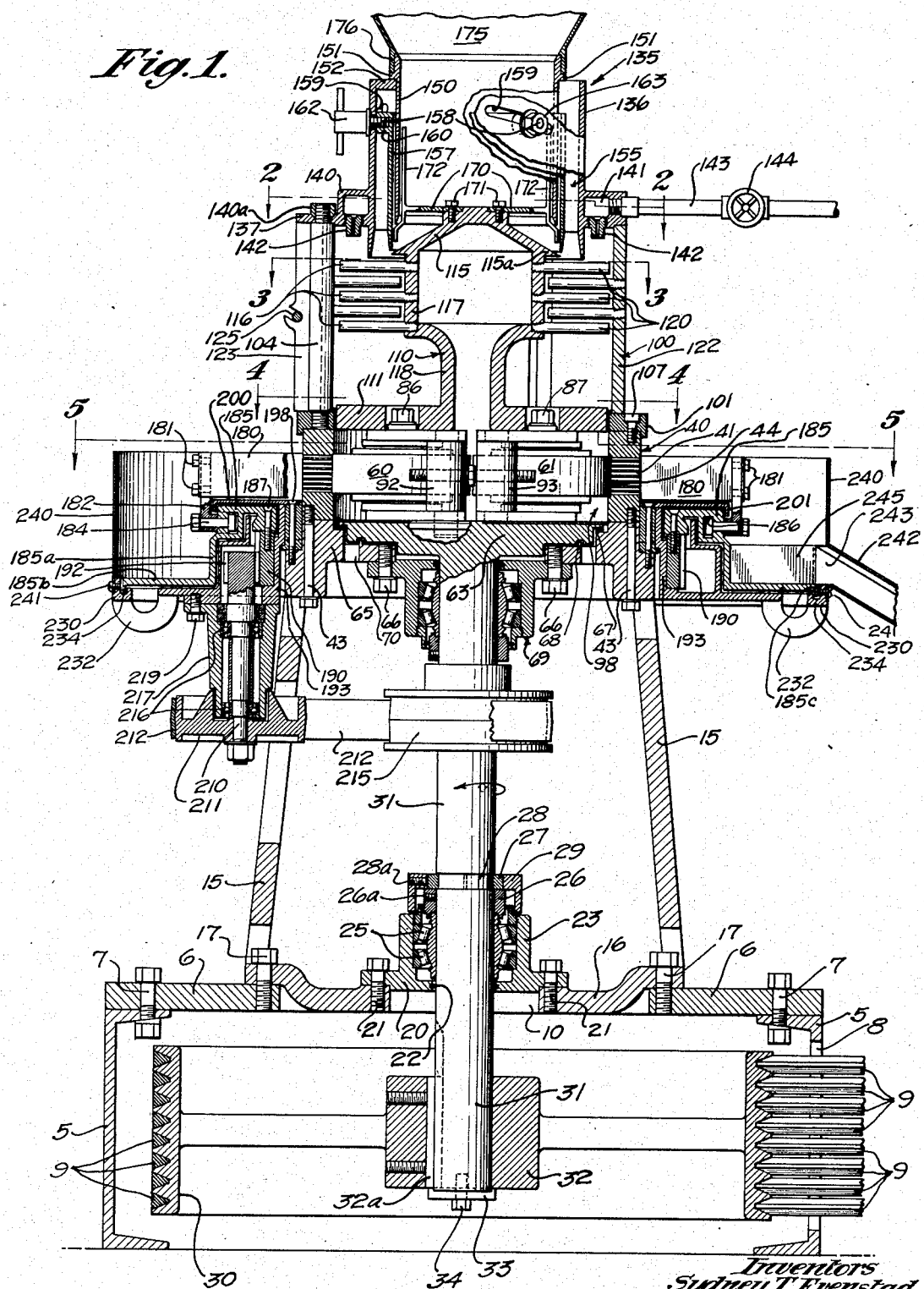
Fig. 1 is a vertical medial sectional view of the device.

The base of the machine is comprised of channel members 5 on which is secured base plate 6 by means of bolts 7. One of the channel members 5 has an opening 8 to pass the drive belts 9. The base plate 6 is provided with a central opening 10, for the purpose to be described.

A circular housing member 15 has a concave base portion 16 which fits over opening 10 and which is secured to plate 6 by bolts 17. A bearing housing 20 is secured to plate 16 over opening 10 by bolts 21. Housing 20 has a central shaft-passing opening 22 and a cylindrical projection 23 which houses the roller bearing unit 25. For the main drive we utilize a sheave 30 housed in the base member. This sheave is circumferentially grooved to take the V-belts 9 which lead from a power element not shown. The sheave 30 is secured to the drive shaft 31 by a hub 32, a sheave cap 33 being secured to the end of the shaft by bolt 34, the hub being keyed to shaft 31 by key 32a.

A collar 26 is secured on shaft 31 immediately above and bears against the bearing unit, being secured on the shaft by set screw 26a, and a split thrust collar 27 is mounted in the annular recess 28 in shaft 31. A shaft supporting and dust protection collar 29 is secured to thrust collar 27 by set screw 28a.

The top 65 of housing 15 forms a support for the die 40, the latter being a stationary ring die having vertically spaced, staggered rows of orifices 41 therethrough, the dies being secured to housing 15 by tap bolts 43. While in the particular adaptation shown in the drawings we show eight rows of orifices 41, it will be understood that the number and spacing may be varied. The size of orifices 41 determines the cross-sectional area of the pellets. The inner face of the die is provided with an annular recess 44, which recess is of a width substantially commensurate with the thickness of the impacting rollers 60, 61.

Housing 15 has top portion 65 to which shaft bearing 69 is secured by tap bolts 66. Shaft 31 has a top annular flange 63, and between the under face of said flange and the top of housing portion 65 are provided labyrinth seals 67, 68. To permit escape of any mash or condensate which might pass the seal 67, we provide a number of breather holes 70 through housing portion 65.

The impactor unit (see Figs. 1, 5, 6, 7 and 8) is carried on drive shaft flange 63 by means of a pair of studs 80, said studs being screwthreaded at their lower ends into flange 63 and carry nuts 80a at their top ends, the top portion of the studs being of reduced diameter so as to present an annular shoulder 80b. The impactor unit includes a pair of impacting rollers 60, 61 rotatably mounted, by means of bearing units 73a, 74a, upon vertical pins 73, 74, respectively. The impacting rollers are mounted between a top cover plate and a bottom cover plate, the top cover plate being comprised of horizontally spaced sections 84, 85 and the bottom plate being comprised of spaced sections 82, 83. The lower end of pin 73 is screwthreaded into lower plate section 82 and its upper end extends through top plate section 84 where it is capped by nut 86. The lower end of pin 74 is screwthreaded into lower plate section 83 and its upper end extends through top plate section 85 where it is capped by nut 87. For protection of bearings 73a, 74a, respectively, we provide multiple groove labyrinth seal members 73b, 73c, 74b, 74c. The inner companion portion of each seal member is secured to its impacting roller by bolts 79 and the outer portion is held in position by bearing against the respective top and bottom cover plates 82, 84 and 83, 85.

For adjusting the impacting rollers with respect to each other and with respect to the die, we provide a pair of adjustment screws 90, 91, one end of each screw having right-hand threads and the other end having left-hand threads. Screw 91 is threaded at its respective end portions through hinge pins 92, 93 and screw 90 is threaded at its respective ends through hinge pins 94, 95. Pins 92, 94 are journalled at their reduced ends in cover plate sections 82, 84 and pins 93, 95 are likewise journalled in cover plate sections 83, 85. The lower end 96 of each of pins 92 and 95 extends downwardly through the respective bottom cover plate sections 82, 83 and projects into a hole 97 provided in the top surface of drive shaft flange 63, to provide drive studs for the impacting unit.

Figure 5:
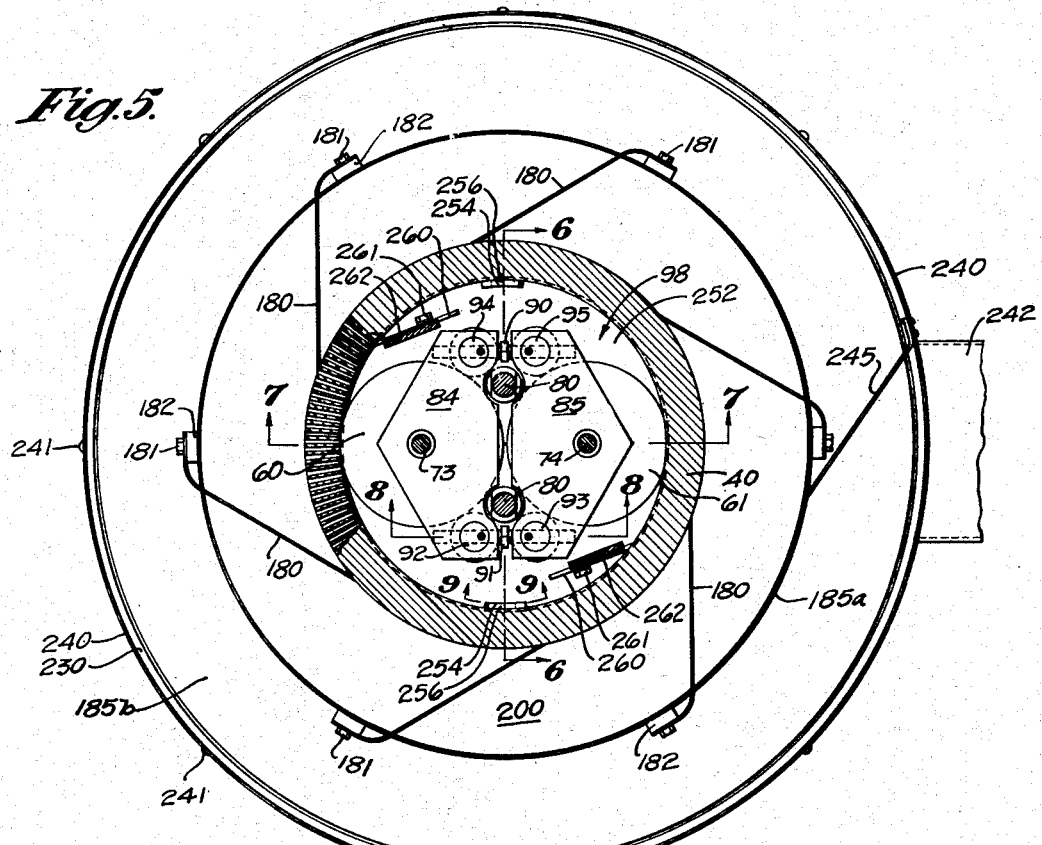
Fig. 5 is a section on line 5—5 of Fig. 1.

As best shown in Fig. 5 a space is left around the top cover plate sections 84, 85 and the bottom cover plate sections 82, 83 so as to provide a mash receiving chamber 98 between the impacting unit and the inner face of the die 40.

A mixer unit housing 100 is secured to a base ring 101 at the top of the die 40 by three studs 104, said ring being in turn secured to the top of die 40 by tap bolts 107.

The mixer unit includes a hollow rotor 110 having a flanged bottom 111 which, as will be seen in Fig. 4, is narrower than the interior diameter of the housing 100 to allow space 112 between two of its sides and the interior face of the housing for the passage of mash to the impactor unit. The flange 111 is secured to the top of studs 80 by the nuts 80a, so that, in the presently preferred form, it will rotate clockwise (as viewed in plan) with the impactor unit. The top portion 115 of the rotor 110 is substantially conical to provide a feeder cone for passing an even flow of the mash from the feeder element to be later described. The base portion 115a of said conical top slightly overhangs side wall 117 of the rotor so as to deliver the material to the mixer at a point intermediate the rotor and its housing wall. A plurality of circumferentially spaced, radially extending, mixing fingers 116 are secured at one end in part 117 of rotor 110, being preferably cast therein, which part 117 is of larger diameter than the neck portion 118.

Cast at one end into housing 100 and projecting inwardly so as to allow fingers 116 to pass therebetween, we provide a plurality of circumferentially spaced stationary fingers 120. As shown in Fig. 1, fingers 116 are arranged in three vertically spaced circumferential rows around rotor portion 117 and fingers 120 are arranged in two vertically spaced circumferential rows around the inner face of housing 100; although, of course, the number of rows of fingers and the number of fingers in each row are matters which may be varied in particular cases.

As shown in Fig. 3, the housing 100 is composed of three segments 121, 122 and 123, which segments are secured together at the studs 104 by bolts 125. The housing is thus made in segments to facilitate assembling and disassembling the device for purposes of cleaning.

The feeder element 135 comprises an outer circular casing 136 which has a bottom annular flange 137 secured to the top ends of studs 104 by nuts 104a. An annular jacket portion 140 provides an annular steam chamber 141 from which a plurality of jets 142 lead into the mixing chamber (see Fig. 2). While we have shown sixteen such jets, it will be understood that the number may be varied if desired. A steam feed line 143, controlled by valve 144, leads to the steam chamber from a steam supply, not shown. The feeder has an inner circular wall 150 which has an annular flange 151 near its top which rests on inwardly projecting flange portions 152 of outer casing 136. While any desirable number of flanges 152 may be utilized, we prefer to use three (only one of which is illustrated in Fig. 1), their purpose being to support the inner wall 150 in spaced relation to casing 136 to provide annular vent space 155 communicating from the mixing chamber to atmosphere to permit escape of any excess steam from the mixing chamber.

An adjustable feeder sleeve 157 is held in adjustable position between the outer casing 136 and inner wall 150 by means of adjusting bolts 158 which pass through diagonally disposed slots 159 through outer casing 136. The inner end of each of said bolts projects into a socket 160 provided in the outer wall of the adjustable feeder sleeve 157, so that as the bolts are moved along their slots the sleeve is raised or lowered with respect to the conical top 115 of the rotor, to regulate the flow of mash from the feeder to the mixing chamber. While any desired number of sets of bolts 158 and slots 159 may be used, we find three sets to be suitable. At least one of the adjusting bolts 158 is provided with a lock nut having a handle portion 162, while the remaining bolts may be provided with conventional lock nuts 163. We make this provision because, in practice, one nut is usually sufficient to retain the device in an adjusted position, so that the handle is used to make the adjustment while the remaining nuts 163 are left unlocked.

Secured to the top portion 115 of the rotor by bolts 171 is a spider 170 which carries agitating fingers 172. These fingers rotate with the rotor and agitate the mash to facilitate evenness of feed. A hopper 175 is mounted on the feeder by means of its annular flange 176 resting upon annular flange 151.

A plurality of pellet shearing blades 180 are secured by bolts 181 to a bracket 182, which bracket is secured by bolts 184 to and rotates with ring 185. Bolts 184 are mounted in the annular T-slot 186 formed in ring 185, said slot having spaced enlarged openings to pass the heads of bolts 184 into the slot. The blade-supporting brackets are thus mounted to provide for adjusting the blades circumferentially of the ring 185. Ring 185 is secured by screws 187 to a ring gear 190 whose teeth engage with pinion gear 192. An annular ring gear housing 193 has an annular shoulder 194 which rests on an annular shoulder 195 provided on the die centering ring 197, which latter ring is secured to housing member 65 by screws 198. A stationary pellet receiving platform 200, having a downwardly disposed peripheral flange 201, is secured to ring 197 by screws 198. Rotating ring 185 has a downwardly disposed annular portion 185a which terminates in an annular, horizontally disposed, pellet conveyor 185b, which conveyor rotates with the cutters 180 and ring gear 190. Pinion gear 192 is secured on and driven by pinion shaft 210, to the lower end of which is secured a pulley 211 which is driven by belt 212 from a pulley 215 secured on the drive shaft 31. Shaft 210 is journalled in bearings 216 which are housed in sleeve 217, the latter sleeve being secured by bolts 219 to stationary housing member 193.

A ring 230 extends around the stationary housing member 193 and is supported thereon by circumferentially spaced U-shaped projections 232 (typically four in number) which are formed integral with housing member 193 and the ring 230 and extend radially outwardly from said housing to support the ring 230. Annular groove 234 is provided in the top face of ring 230 and into this groove projects the downwardly disposed peripheral flange 185c of conveyor 185b.

A guard ring 240 is secured, by screws 241, to the outer face of ring 230 to prevent pellets on conveyor 185b from escaping over the outer edge of the platform. An outlet tube 242 extends outwardly and downwardly from an opening 243 in guard ring 240, and secured to ring 240 adjacent the right hand side of opening 243 is a stationary guide plate 245 which extends diagonally inwardly to wall 185a. Thus, as the platform 185b rotates, the pellets thereon are moved against the guide plate 245 and are guided into the outlet tube.

To prevent clogging of mash material between the periphery of drive shaft flange 63 and the inner face of annular housing portion 65, we make the flange 63 of slightly smaller diameter than the interior diameter of the housing member 65 so as to leave a small clearance 250 therebetween, this clearance being covered by the annular cover plate 252 mounted on the top face of flange 63. Two diametrically opposite openings 254 (see Fig. 9) are provided through plate 252 near its periphery and a plow 256 is welded or is otherwise suitably secured at one end to plate 252 adjacent each opening, and these plows extend diagonally into the groove provided by clearance 250 to scrape therefrom any mash material that may tend to collect therein. Inasmuch as housing portion 65 is stationary and the plows 256 are secured to the rotating plate 252, the material rides up the top face of the plows into the impacting chamber to be then forced through the die orifices by the impacting rollers.

Figure 6:
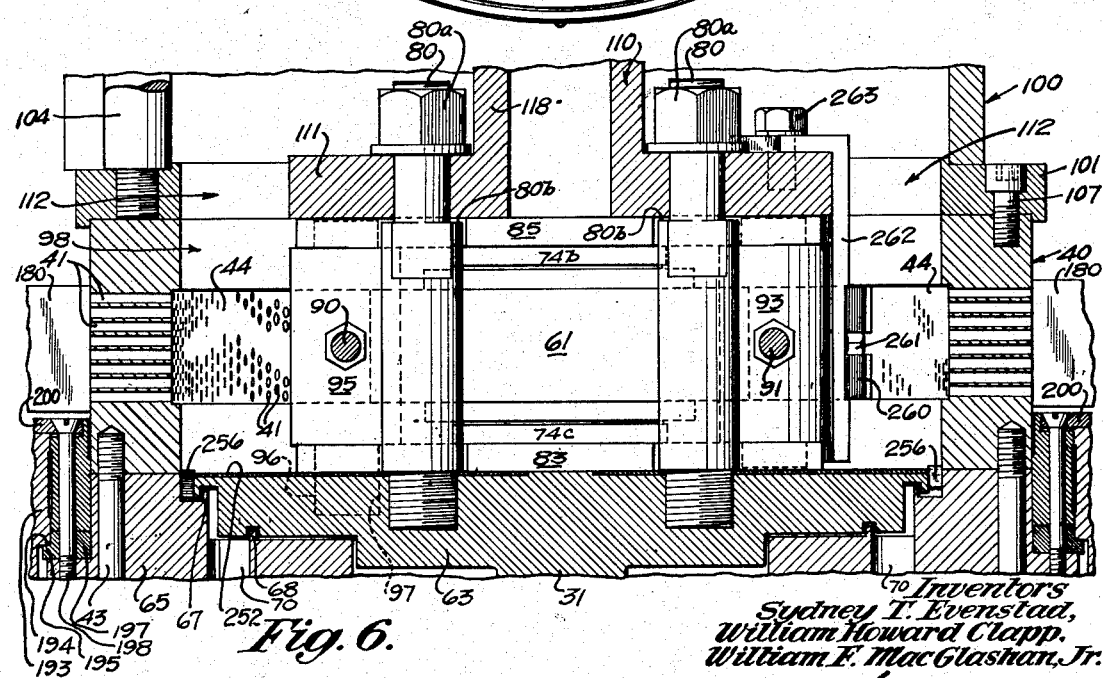
Fig. 6 is a section on line 6—6 of Fig. 5.
Figure 7:
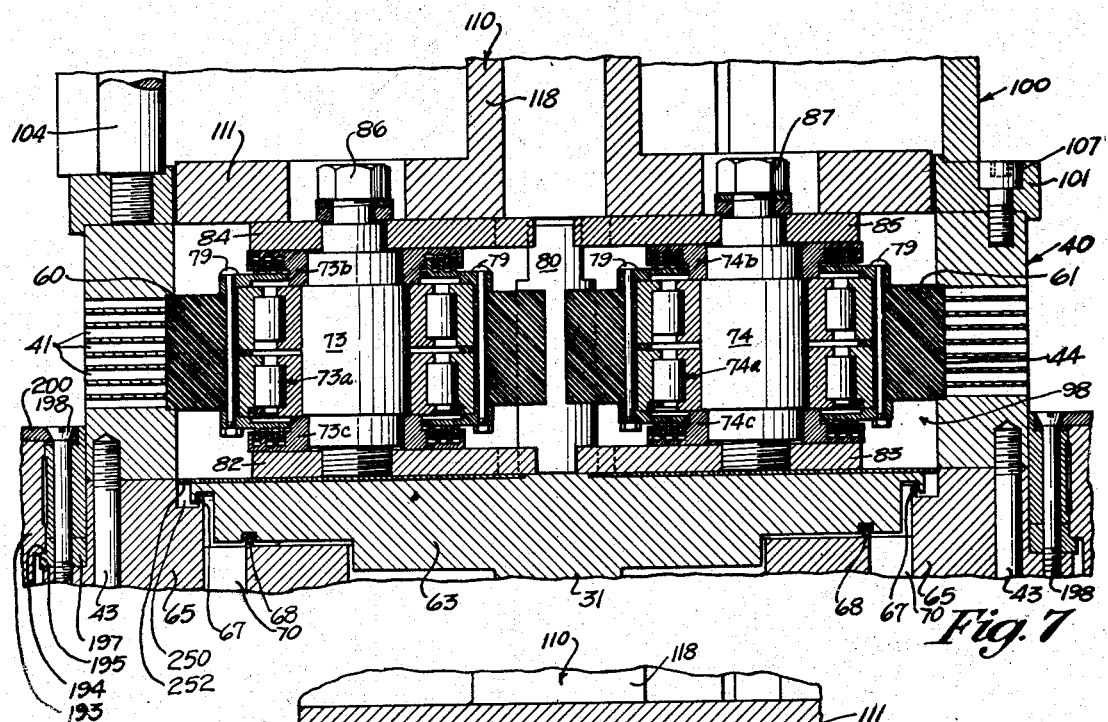
Fig. 7 is a section on line 7—7 of Fig. 5.
Figure 8:
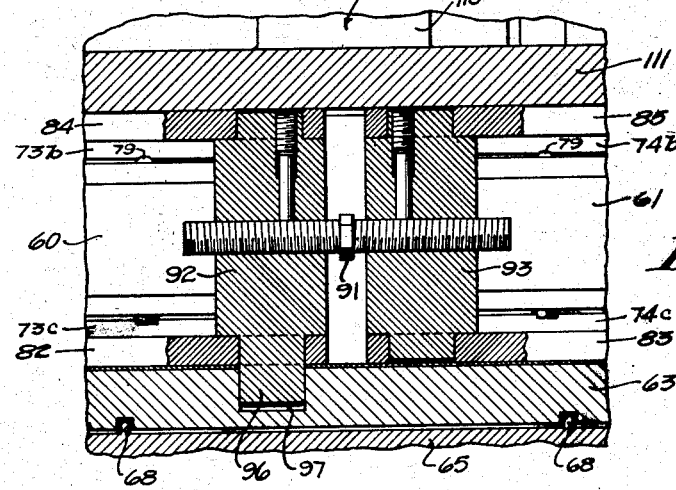
Fig. 8 is a section on line 8—8 of Fig. 5.

As best shown in Figs. 4, 5 and 6, there is a pair of flexible guide plates 260 carried by the rotating impacting unit, each of said plates being secured by a bolt 261 to a bracket 262, which bracket is secured to flange 111 of rotor 110 by a bolt 263. Inasmuch as the impacting unit rotates in a clockwise direction, the guide plate 260 wipes over the inner face of the die orifices ahead of the rollers to form the mash into lamina and guide it into position to be forced through the orifices in thin laminations by the impacting rollers.

The pellet shearing blades 180 are preferably of a resilient material and of a width slightly greater than the orificed area of the die. Inasmuch as the blades 180 are supported on the brackets 182 carried by ring 185, which rotates in a counter-clockwise direction, the blades move over the outer face of the die at the ends of the orifices, so that as the mash emerges from the orifices, the blades shear it off into pellets which fall onto the stationary platform 200, from which they are moved outwardly, by contacting the diagonally disposed front face of the shearing blades, until they drop onto the rotating conveyor 185b, from which they are guided into the outlet tube 242 as before described. While the cross-sectional area of the pellets is determined by the cross-sectional area of the die orifices 41, the length of the pellets is determined by the distance between the respective pellet shearing blades 180. In other words, since the mash is continuously being extruded through the die orifices, the greater the distance is between shearing plates, the greater will be the length of the pellets.

Figure 10:
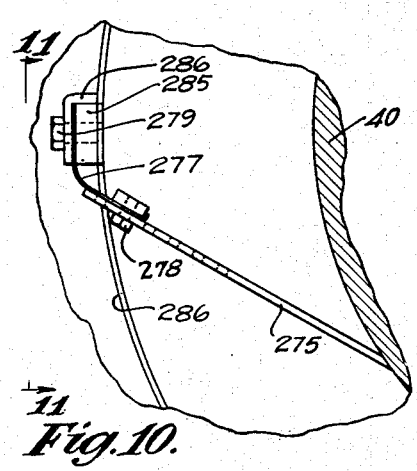
Fig. 10 illustrates a plan of a variational form of cutter element.
Figure 11:
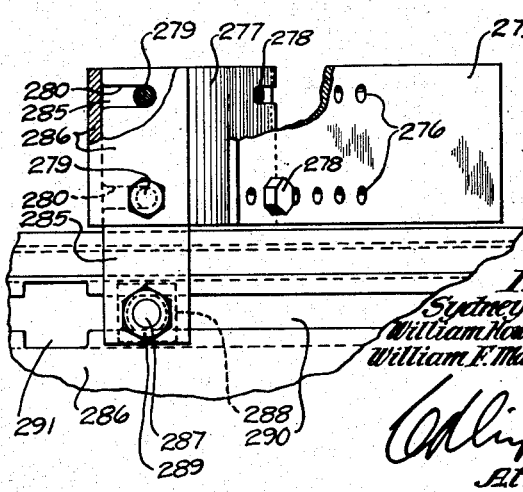
Fig. 11 is a view on line 11—11 of Fig. 10.

In order to increase or decrease the cross-sectional area of the pellets, of course, it is necessary to change the die elements, and it has been found desirable that the length of the die orifices should be increased with any increase in the cross-sectional area of those orifices, and conversely they should be decreased in length as their cross-sectional area is decreased, so that when another die is substituted for a die on the machine, it usually becomes necessary to adjust the length of the shearing blades to accord with the changed thickness of the die. Therefore, as illustrated in Figs. 10 and 11, we have shown a modified form of shearing blade mounting and construction, which provides for a greater range of adjustability. In this form the shearing blade 275 has two parallel rows of spaced bolt holes 276 and the blade is secured to flexible plate 277 by means of two bolts 278, the plate 277 having parallel slots 280 at its end to pass the bolts 279. Plate 277 is secured to the post 285 by bolts 279 and the angled retaining plate 286. Post 285 is adjustably secured to the rotating ring 286 (which ring is of the form and mounting of ring 185 heretofore described) by bolt 287 having a head portion 288 and nut 289, which head is mounted in annular T-slot 290, which slot has enlarged portions 291 for passing a bolt head.

In operation the mash material is placed in hopper 175, from which it moves by gravity into the feeder element 135. By virtue of the rotatable agitating fingers 172, the mash is uniformly fed from the feeder into the mixer around the feeding cone 115, the rate of feed being controlled by adjusting the feeder sleeve 157 with respect to the periphery of the cone in the manner hereinbefore described. As the mash is admixed by rotation of the moving fingers 116 with respect to the stationary fingers 120, steam is injected into the mixture through jets 142 to add moisture. The mixing fingers interpass at a relatively high speed so as to intimately and uniformly admix the molecules of vapor with the mash in suspension. This effects a complete dispersion without disintegration of the mash or destruction of its inherent chemical qualities. From the mixer the mash passes between the sides of flange 111 and the inner wall of ring 101 and around top plate sections 84, 85 into the impacting chamber. The impacting rollers 60, 61, rotating in a clockwise direction, extrude the mash through the die orifices 41 and then the individual pellets are sheared off by the shearing blades 180 which move circumferentially of the die in a counter-clockwise direction, the pellets being sheared off close to the die surface to form clean cuts. This cutting mechanism is adjustable to produce any desired length of pellet, from a thin wafer to a pellet several inches long. After being thus cut, they are moved over the outer edge of the stationary platform 200, by action of the slanted shearing blades which are rotated around the die. The pellets thence drop onto the rotating pellet conveyor 185b which, rotating in a counter-clockwise direction, moves the pellets against the inclined plate 245, which guides them into outlet tube 242.

Inasmuch as the impactor unit is constrained to move within the ring die, which is concentric with the shaft 31 and bearings 25 and 69, and inasmuch as the impacting rollers are oppositely disposed, the forces exerted by the two rollers against the inner face of the ring die are in balance and do not exert any radial pressure against the bearings 69 and 25.

From the foregoing description of operation and structure, it will of course be understood that the force acting to move the mash material towards and through the die orifices is brought about by the centrifugal action of the rollers, aided, as may be necessary, by additional pressure made possible by adjusting the impacting rollers towards the die by adjustment screws 90 and 91. Consequently, the amount of additional pressure thus acquired will vary with the speed of rotation of the impacting unit as well as with the character of the mash being handled. The screw means for adjustment has definite advantages over, for instance, a flexible spring means of adjustment, in that it can position the impactors slightly away from the inner face of the die to allow for a thin spread of mash between the impactor surface of the rollers and the inner face of the die. Such adjustment screws also act to prevent any rebound of the impacting rollers.

We have described the impacting rollers as preferably rotating clockwise and the pellet shearing members as rotating counter-clockwise, but it will be understood, of course, that those directions may be reversed if desired.

While, for the purpose of making our invention understood, we have resorted to various specific details of structure and association of parts, it will be obvious that various modifications may be made without departing from the scope of our invention as defined by the appended claims.

We claim:

1. In a device of the class described having a stationary die ring member with material molding orifices extending from its inner face to its outer face, an impacting element comprising spaced pairs of parallel mounting plates, a spacer pin for spacing apart the plates of each pair, an impacting roller rotatably mounted between each pair of plates, an adjustment screw cooperating with said spacer pins to move said spaced pairs of plates towards and away from each other.

2. In a device of the class described having a stationary die ring member with material molding orifices extending from its inner face to its outer face, an impacting element comprising spaced pairs of parallel mounting plates, a pair of hinge pins between the plates of each pair, impacting rollers, one of said rollers being rotatably mounted between each pair of plates and each of said rollers having an impacting surface coplanar with the inner face of the die ring, and a pair of adjustment screws, each having right hand threads at one end and left hand threads at its other end, each of said screws being threaded at one end into one of the hinge pins of one pair of plates and threaded at its other end into one of the hinge pins of the other pair of plates.

3. In apparatus for forming pellets and the like from a moldable material, a stationary die ring member having material molding orifices extending from its inner face to its outer face, roller means for extruding material through said orifices, cutter means for cutting the extruded material into pellets and the like, said last mentioned means including a cutter mounting ring rotatably mounted around and concentric with the die ring, shearing blades, each of which shearing blades has one end mounted on the mounting ring and its other end extending diagonally inwardly towards the outer face of the die ring, means for mounting the shearing blades on the mounting ring, a drive member for rotating said roller means in one direction and a drive member for rotating the cutter mounting ring and its carried cutters in the opposite direction.

4. In apparatus for forming pellets and the like from a moldable material, a stationary die ring having pellet molding orifices extending from its inner face to its outer face, means within the die ring for extruding material through said orifices, and means for cutting the material into pellets as it emerges from said orifices, said last mentioned means comprising a cutter carrying ring rotatably mounted around and concentric with the die ring, blade carrying posts secured to and spaced apart circumferentially of the ring, a shearing blade secured to each of said posts, each of said blades having a plurality of bolt passing holes spaced apart longitudinally of the blade and bolts selectively cooperating with said holes to permit adjustment of the blades towards and away from the die ring.

5. An apparatus for forming pellets or the like from a moldable material comprising: a base, a ring die mounted horizontally on and secured to the base, material molding orifices extending radially through the die, a drive shaft rotatably mounted in the base and extending to and concentrically of the die, an impacting member secured to the drive shaft and having rollers adapted to rotate over the inner surface of the die to extrude material through said orifices, a cutter element movable circumferentially of the die periphery for shearing the extruded material as it emerges from the orifices, and means for rotating the cutter element, said last mentioned means rotating the cutter element in a direction reverse to and at a speed differing from the speed of rotation of the impacting member.

6. An apparatus of the class described including a base, a vertically disposed drive shaft journalled in the base, said shaft presenting a top annular flange, an impacting element concentrically of and secured to the top surface of the flange, said base presenting a table portion coplanar with and against which the undersurface of the flange rotates, means for providing seals between the table and flange which includes a circular raised portion on the table and a circular recess in the undersurface of the flange into which said raised portion projects, and a horizontally disposed stationary ring die secured to the table and surrounding the impacting element.

7. The device of claim 6 which includes a drainage hole extending through said table beneath said flange.

8. In apparatus of the class described having a base, a stationary ring die mounted horizontally on the base, material molding orifices extending radially through the ring die, means in the ring die for extruding material outwardly through said orifices, a cutter mounting ring rotatably mounted on the base around and concentric of the ring die, and cutter blades cooperating with the exterior face of the ring die to shear said material as it passes through said orifices, said cutter blades being mounted on and circumferentially adjustable along said cutter mounting ring.

9. In a pellet forming apparatus, a base, a stationary ring die horizontally mounted on the base, said ring die having pellet forming orifices extending radially therethrough, means for extruding pellet forming material through said orifices, cutters for shearing said material into pellets as it emerges from said orifices, means for collecting said sheared pellets including a pellet carrying platform rotatably mounted on the base and being rotatable around the ring die, and a stationary collecting arm secured to the base and extending across the top of said platform in position to engage the pellets carried on said platform.

10. In apparatus of the class described having a base, a stationary ring die mounted horizontally on the base, material molding orifices extending radially through the ring die, means in the ring die for extruding material outwardly through said orifices, a cutter mounting ring rotatably mounted on the base around and concentric of the ring die, cutter blades cooperating with the exterior face of the ring die to shear said material as it passes through said orifices, and means for adjustably mounting said cutter blades on said cutter mounting ring including an annular T slot in the cutter mounting ring, blade supporting posts, means for securing the respective blades to the upper ends of the respective posts, bolts for securing the lower end of each of the posts to the cutter mounting ring, each bolt having a headed portion which is slidably mounted in the slot, and a threaded nut on its opposite end for adjustably securing said bolt in any selected position along said slots.

SYDNEY T. EVENSTAD.
WM. HOWARD CLAPP.
WILLIAM F. MacGLASHAN, Jr.